United States Patent [19]
Upadhyay et al.

[11] Patent Number: 5,998,930
[45] Date of Patent: *Dec. 7, 1999

[54] ELECTRONIC BALLAST WITH TWO-STEP BOOST CONVERTER AND METHOD

[75] Inventors: Anand K. Upadhyay, Libertyville; Bhadresh Mehta, Hanover Park; John G. Konopka, Barrington, all of Ill.

[73] Assignee: Motorola Inc., Schaumburg, Ill.

[ * ] Notice: This patent is subject to a terminal disclaimer.

[21] Appl. No.: 08/738,945

[22] Filed: Oct. 24, 1996

[51] Int. Cl.$^6$ .................................................. H05B 37/02
[52] U.S. Cl. .................... 315/106; 315/247; 315/DIG. 7; 315/307; 315/209 R
[58] Field of Search ...................................... 315/102, 105, 315/106, 107, 247, DIG. 7, DIG. 2, 291, 209 R, 307

[56] References Cited

U.S. PATENT DOCUMENTS

| | | | |
|---|---|---|---|
| 3,720,861 | 3/1973 | Kahanic | 315/101 |
| 4,588,924 | 5/1986 | Luursema et al. | 315/107 |
| 4,673,844 | 6/1987 | Maytum et al. | 315/200 R |
| 4,791,338 | 12/1988 | Dean et al. | 315/174 |
| 4,806,830 | 2/1989 | Ueki | 315/244 |
| 4,935,669 | 6/1990 | Nilssen | 315/105 |
| 4,963,795 | 10/1990 | Nilssen | 315/205 |
| 5,047,690 | 9/1991 | Nilssen | 315/224 |
| 5,047,694 | 9/1991 | Nuckolls et al. | 315/290 |
| 5,049,783 | 9/1991 | Kroening | 315/102 |
| 5,144,195 | 9/1992 | Konopka et al. | 315/94 |
| 5,191,263 | 3/1993 | Konopka | 315/209 R |
| 5,418,434 | 5/1995 | Kamens et al. | 315/169.3 |
| 5,500,573 | 3/1996 | Schulz | 315/247 |

*Primary Examiner*—Michael B Shingleton
*Attorney, Agent, or Firm*—Kenneth D. Labudda; Gary J. Cunningham

[57] ABSTRACT

An electronic ballast (10) for fluorescent lamps includes a rectifier circuit (100), a boost converter (200), and an inverter (500). The boost converter (200) includes a boost control circuit (400) and a shifting circuit (300). The shifting circuit (300) provides filament preheating by maintaining the boost output voltage at a first level for a predetermined delay period following startup of the boost converter, and then increasing the boost voltage to a second level upon completion of the delay period in order to ignite and operate the lamps. In a preferred embodiment, shifting circuit (300) comprises a shunt circuit (320) and a time delay circuit (360), and inverter (400) is a series resonant half-bridge inverter.

20 Claims, 4 Drawing Sheets

-PRIOR ART-

ELECTRONIC BALLAST WITH TWO-STEP BOOST CONVERTER AND METHOD

FIELD OF THE INVENTION

The present invention relates to the general subject of electronic ballasts for gas discharge lamps and, in particular, to apparatus and method of operation for an electronic ballast with a two-step boost converter.

BACKGROUND OF THE INVENTION

A common type of electronic ballast employs a boost converter in combination with a resonant inverter that supplies high frequency current for efficiently powering one or more fluorescent lamps. Use of a boost converter provides a number of important benefits, including a high degree of power factor correction, low harmonic distortion in the AC line current, and load regulation.

U.S. Pat. No. 5,144,195 discloses an electronic ballast that uses the startup delay of the boost converter (i.e., the period of time between application of AC power to the ballast and startup of the boost converter) to provide a period during, which the lamp filaments are preheated prior to ignition of the lamps. An asymptotic plot of the boost converter output voltage for such a ballast is shown in FIG. 1. The ballast disclosed in U.S. Pat. No. 5,144,195 economically provides filament preheating in a "passive" manner and thus avoids the need for dedicated filament preheating circuitry.

For many such electronic ballasts, and particularly those that are designed for powering more than two lamps, it is highly desirable, if not essential, that operating losses in the inverter be minimized in order to enhance ballast efficiency and to reduce the ballast operating temperature so that long-term reliability of electrical components is ensured. Toward this goal, it is highly advantageous to design the ballast with an elevated boost output voltage. Since, for a given lamp load, a higher boost output voltage results in a proportionately smaller flow of current through many electrical components of the inverter, inverter power losses can be reduced considerably if a higher boost output voltage is used.

Unfortunately, although operating with an elevated boost output voltage helps reduce inverter power losses and enhance ballast energy efficiency, it also tends to interfere with the desirable function of using the boost startup delay period to passively provide a filament preheating period. As a simple rule, when the ratio of the boost operating voltage to the peak value of the AC line voltage exceeds a certain value, it becomes increasingly difficult to passively provide adequate filament preheating without violating other critical design constraints. This problem is particularly acute in ballasts that are designed to operate multiple lamps which are connected in series with each other.

The filament preheating voltage that is provided by a ballast like that disclosed in U.S. Pat. No. 5,144,195 may be computed by the following equation:

$$V_{FIL,PREHEAT} = V_{OUT,IGNITION} \div V_{OUT,OPERATING}) *$$
$$(V_{BOOST,PREHEAT} \div V_{BOOST,OPERATING}) *$$
$$V_{FIL,OPERATING}$$

As a quantitative example that illustrates the nature of the problem, consider a ballast for powering four series connected T8 type fluorescent lamps from a 120 volt (rms) AC source. In order to optimize boost converter efficiency and power factor correction, the boost output voltage, $V_{BOOST, OPERATING}$, for a ballast that is powered from a 120 volt (rms) AC source is typically set in the range of about 250 to 275 volts. Let us assume here that a boost output voltage of 250 volts is desired. $V_{BOOST,PREHEAT}$, which is the output voltage of the boost converter prior to startup, is approximately equal to the peak value of the AC line voltage, which is equal to 120 * 1.414, or 170 volts. Let us assume that it is known that the ballast output voltage, $V_{OUT,IGNITION}$, must be about 800 volts (rms) in order to ignite the lamps following proper preheating of the filaments, and that the output voltage after the lamps are ignited and operating, $V_{OUT,OPERATING}$, is about 600 volts (rms). Finally, it is specified that $V_{FIL,OPERATING}$, which is the filament voltage provided to the lamps under normal operation, should be no greater than 4.0 volts (rms) Substituting these values into the above equation gives:

$$V_{FIL,PREHEAT} = (800 \div 600) * (170 \div 250) * (4.0)$$
$$= 3.63 \text{ volts (rms)}$$

The above value for $V_{FIL,PREHEAT}$, if applied for approximately 500 milliseconds, is generally considered sufficient for preheating of the filaments prior to igniting the lamps.

Let us now assume that a higher boost operating voltage, say 400 volts, is needed in order to reduce operating losses in the inverter. In this case, if we rely on the boost startup delay period to provide filament preheating, we obtain:

$$V_{FIL,PREHEAT} = (800 \div 600) * (170 \div 250) * (4.0)$$
$$= 2.27 \text{ volts (rms)}$$

which is insufficient for preheating of the lamp filaments.

From the preceding example, it should be clear that increasing the boost operating voltage past a certain point tends to preclude proper filament preheating in ballasts that use what might be termed the "passive approach". One solution to this problem that is well-known in the prior art is to abandon the passive approach entirely and instead use dedicated filament preheating circuitry. Unfortunately, such dedicated circuitry is quite extensive and may add dramatically to the material cost and physical size of the ballast.

It is thus apparent that a method and circuit for ensuring adequate filament preheating in a ballast with an elevated boost voltage that does not require extensive or costly additional circuitry would constitute a significant improvement over the prior art.

DETAILED DESCRIPTION OF THE PREFERRED EMBODIMENTS

Figure 1:
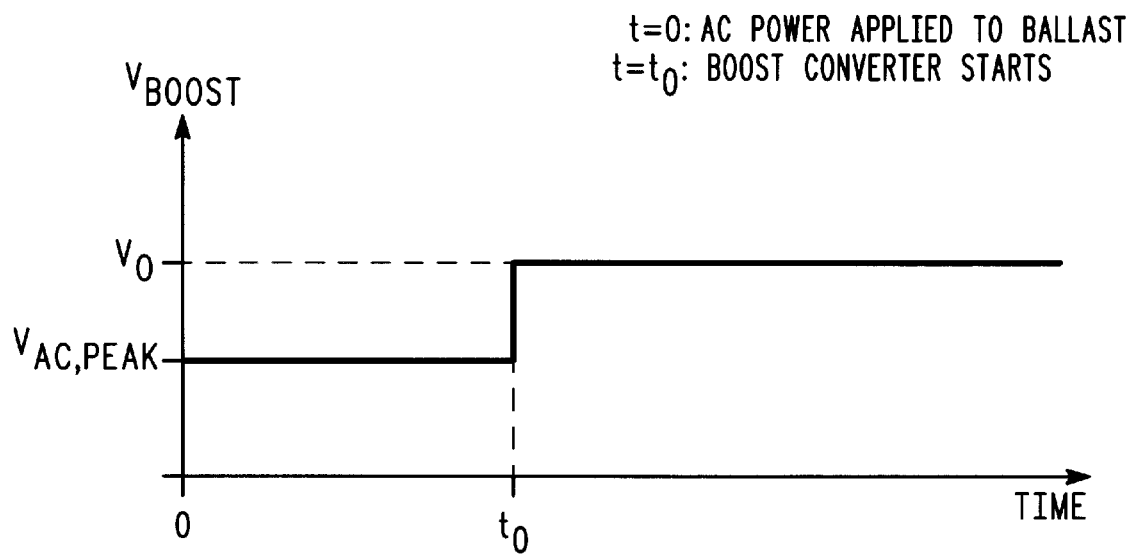
FIG. 1 is an asymptotic plot of the boost converter output voltage for a prior art ballast that uses the startup delay of the boost converter to provide filament preheating.
Figure 2:
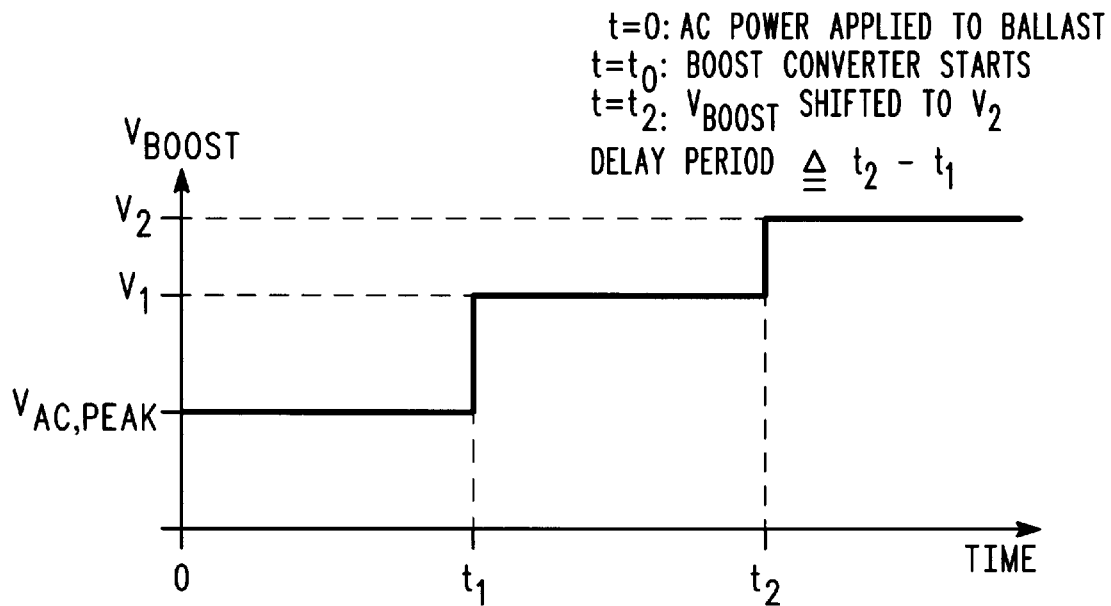
FIG. 2 is an asymptotic plot of the boost converter output voltage for a two-step boost converter, in accordance with the present invention.

A method of operating a boost converter in an electronic ballast for driving at least one fluorescent lamp with heatable filaments is illustrated in FIG. 2, which shows the resulting boost converter output voltage, $V_{BOOST}$. The method comprises the steps of:

(a) providing a filament preheat period ($t_1 \leq t < t_2$) wherein $V_{BOOST}$ is maintained at a first level, $V_1$, for a predetermined delay period, $t_2-t_1$, after the boost converter begins to operate at $t=t_1$;

(b) shifting $V_{BOOST}$ to a second level, $V_2$, that is greater than the first level, $V_1$, upon completion of the delay period (at $t=t_2$); and (c) maintaining $V_{BOOST}$ at the second level, $V_2$, in order to provide steady-state operating power for the lamps.

This method of operating a boost converter in a two-step fashion accommodates steady-state operation at an elevated boost output voltage. The proposed method thus allows for enhanced inverter efficiency, yet provides excellent lamp life by supplying appropriate preheating voltage for fluorescent lamp filaments prior to igniting the lamps.

Figure 3:
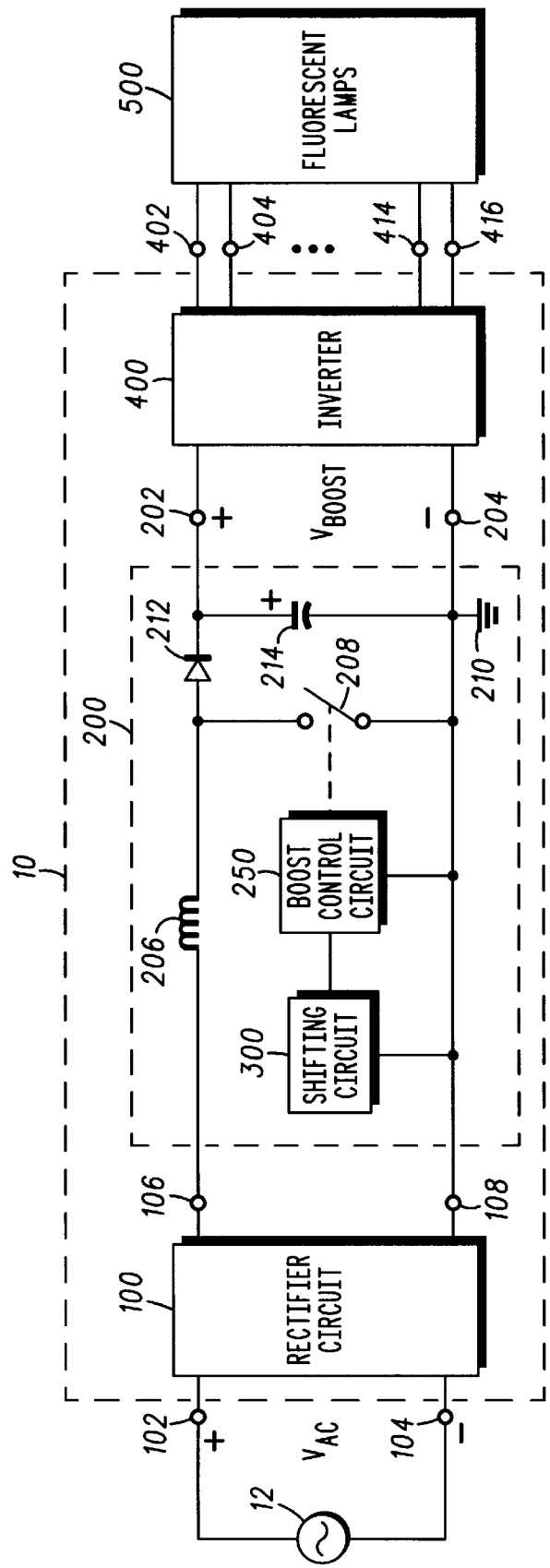
FIG. 3 is a block diagram schematic of an electronic ballast having a two-step boost converter that includes a shifting circuit, in accordance with the present invention.

An electronic ballast 10 that implements the proposed method is described in FIG. 3. The ballast 10 comprises a rectifier circuit 100, a two-step boost converter 200, and an inverter 400. Rectifier circuit 100 has a pair of input connections 102,104 that are adapted to receive a source of alternating current 12, and a pair of output connections 106,108. Boost converter 200, which is coupled across the rectifier circuit output connections 106,108, is operable to provide a boost voltage, $V_{BOOST}$, between first and second output terminals 202,204. The second output terminal 204 is coupled to a circuit ground node 210. Inverter 400 is coupled across the boost converter output terminals 202,204, and is adapted to power a fluorescent lamp load 500 that includes at least one fluorescent lamp.

As shown in FIG. 3, boost converter 200 includes a boost control circuit 250 for driving a boost switch 208, and a shifting circuit 300. Shifting circuit 300 is coupled to boost control circuit 250, and is operable to:

(i) maintain $V_{BOOST}$ at a first level, $V_1$, for a predetermined delay period ($T_{PREHEAT}=t_2-t_1$) following startup of the boost converter at $t=t_1$; and (ii) increase $V_{BOOST}$ from the first level, $V_1$, to a second level, $V_2$, upon completion of the delay period, $T_{PREHEAT}$, at $t=t_2$.

Ballast 10 thus allows for operation at an elevated boost output voltage, but circumvents the need for expensive dedicated filament preheating circuitry through its use of a low voltage shifting circuit 300 in boost converter 200.

In order to provide a sufficient degree of filament preheating prior to attempting to ignite the lamps, it is preferred that the delay period, $T_{PREHEAT}$, be in the range of about 300 milliseconds to about 800 milliseconds, the particular value of which depends on the peak value of the filament preheating voltage, $V_{FIL,PREHEAT}$, which is itself dependent upon a number of design considerations specific to inverter 400. As a general rule, for low values of $V_{FIL,PREHEAT}$, a longer delay period is desirable, whereas for higher values of $V_{FIL,PREHEAT}$, a shorter delay period is sufficient.

It is likewise preferred that the first level, $V_1$, of the boost voltage be set at about 300 volts, and that the second level, $V_2$, be set at about 400 volts. These values, which are appropriate for ballasts that are powered from an AC source having a nominal rms voltage of 120 volts, provide a good compromise between the competing requirements of enhanced inverter efficiency and proper boost converter operation. In this regard, it is important to appreciate that it becomes increasingly difficult to achieve exceptional power factor correction and efficient operation of boost converter 200 if $V_2$ is set to too great a value.

Figure 4:
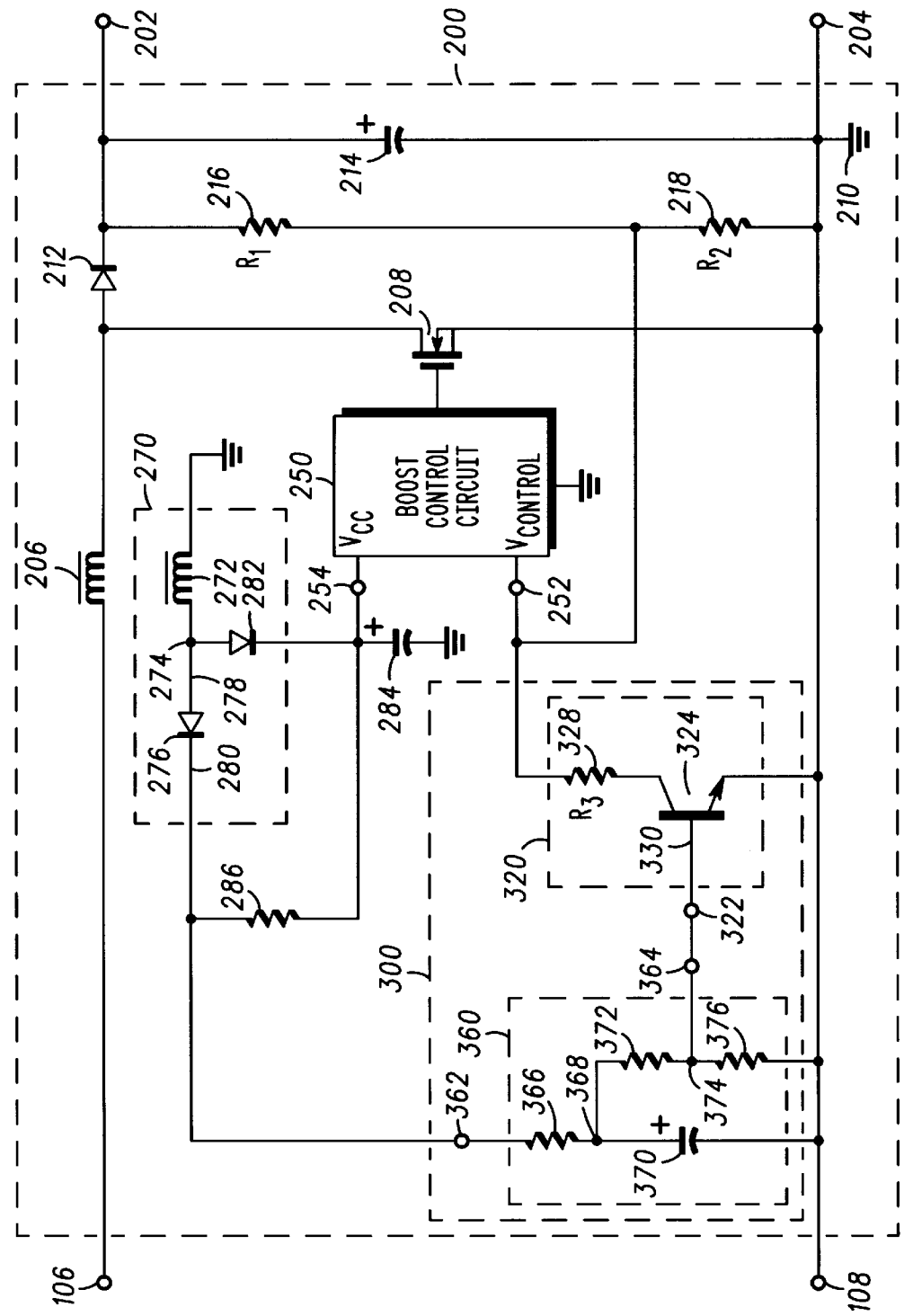
FIG. 4 is a circuit diagram of a two-step boost converter, in accordance with a preferred embodiment of the present invention.

In a preferred embodiment of ballast 10, as shown in FIG. 4, boost converter 200 includes an auxiliary supply 270, and boost control circuit 250 includes a voltage control input 252. Shifting circuit 300 comprises a shunt circuit 320 and a time delay circuit 360. Time delay circuit 360, which is operable to activate shunt circuit 320 upon completion of the delay period ($T_{PREHEAT}$), has a supply input 362 that is coupled to auxiliary supply 270, and a trigger output 364 that is coupled to an enable input 322 of shunt circuit 320.

As described in FIG. 4, boost converter 200 also includes standard components such as a boost inductor 206, a boost rectifier 212, and a bulk capacitor 214. Resistors 216 and 218, the resistances of which are respectively designated as R1 and R2, serve as a voltage feedback network that allows boost control circuit 250 to monitor and control the boost output voltage according to the following well-known relationship:

$$V_{BOOST}=[(R1+R2) \div R2] * V_{REF}$$

where $V_{REF}$ is a reference voltage that is internal to boost control circuit 250. For example, if boost control circuit 250 is implemented using a standard pulse-width modulator (PWM) or power factor correction (PFC) integrated circuit, such as the MC33262 integrated circuit manufactured by Motorola, Inc., $V_{REF}$ is equal to about 2.5 volts.

In a preferred embodiment of boost converter 200, as shown in FIG. 4, shunt circuit 320 comprises a series combination of a shunt switch 324 and a shunt resistor 328. Shunt switch 324, which may be implemented using a bipolar junction transistor, a field effect transistor, or any of a number of controlled switching devices, has a turn-on threshold voltage, $V_{ON}$, and a control lead 330 that is coupled to enable input 322. Shunt switch 324 is operable to turn on and effectively connect shunt resistor 328 between the voltage control input 252 and circuit ground 210 when a voltage equal to $V_{ON}$ is applied to control lead 330.

Referring again to FIG. 4, time delay circuit 360 comprises a timing resistor 366 that is coupled between the supply input 362 and a first node 368, a timing capacitor 370 that is coupled between the first node 368 and circuit ground 210, and a voltage divider comprising a first divider resistor 372 and a second divider resistor 376. The first divider resistor 372 is coupled between the first node 368 and a second node 374, the second node being 374 being coupled to trigger output 364, and the second divider resistor 376 is coupled between the second node 374 and circuit ground 210.

In a preferred embodiment, auxiliary supply 270 comprises a secondary winding 272 on boost inductor 206 and a supply rectifier 276. Secondary winding 272 is coupled between a third node 274 and circuit ground 210. Supply rectifier 276 has an anode 278 that is coupled to the third node 274, and a cathode 280 that is coupled to the supply input 362 of time delay circuit 360.

In one embodiment, auxiliary supply 270 also serves as a bootstrap source that provides operating power for boost control circuit 250. Specifically, a bootstrap diode 282 is coupled between third node 274 and a dc supply input 254 of boost control circuit 250. A filtering capacitor 284, which serves to smooth out the voltage provided by auxiliary supply 270, is coupled between dc supply input 254 and circuit ground 210.

As shown in FIG. 4, auxiliary supply 270 does not begin to operate and supply current until boost converter 200 begins to operate. However, boost converter 200 cannot begin to operate until boost control circuit 250 is supplied with sufficient voltage at dc supply input 254 to turn on and begin switching of boost switch 208. Following application of AC power to ballast 10, startup resistor 286 begins to charge capacitor 284. Eventually, the voltage across capacitor 284 reaches a level sufficient to start boost control circuit 250. Shortly after boost switching begins, auxiliary supply 270 becomes operable and supplies the power required to sustain operation of boost control circuit 250.

Figure 5:
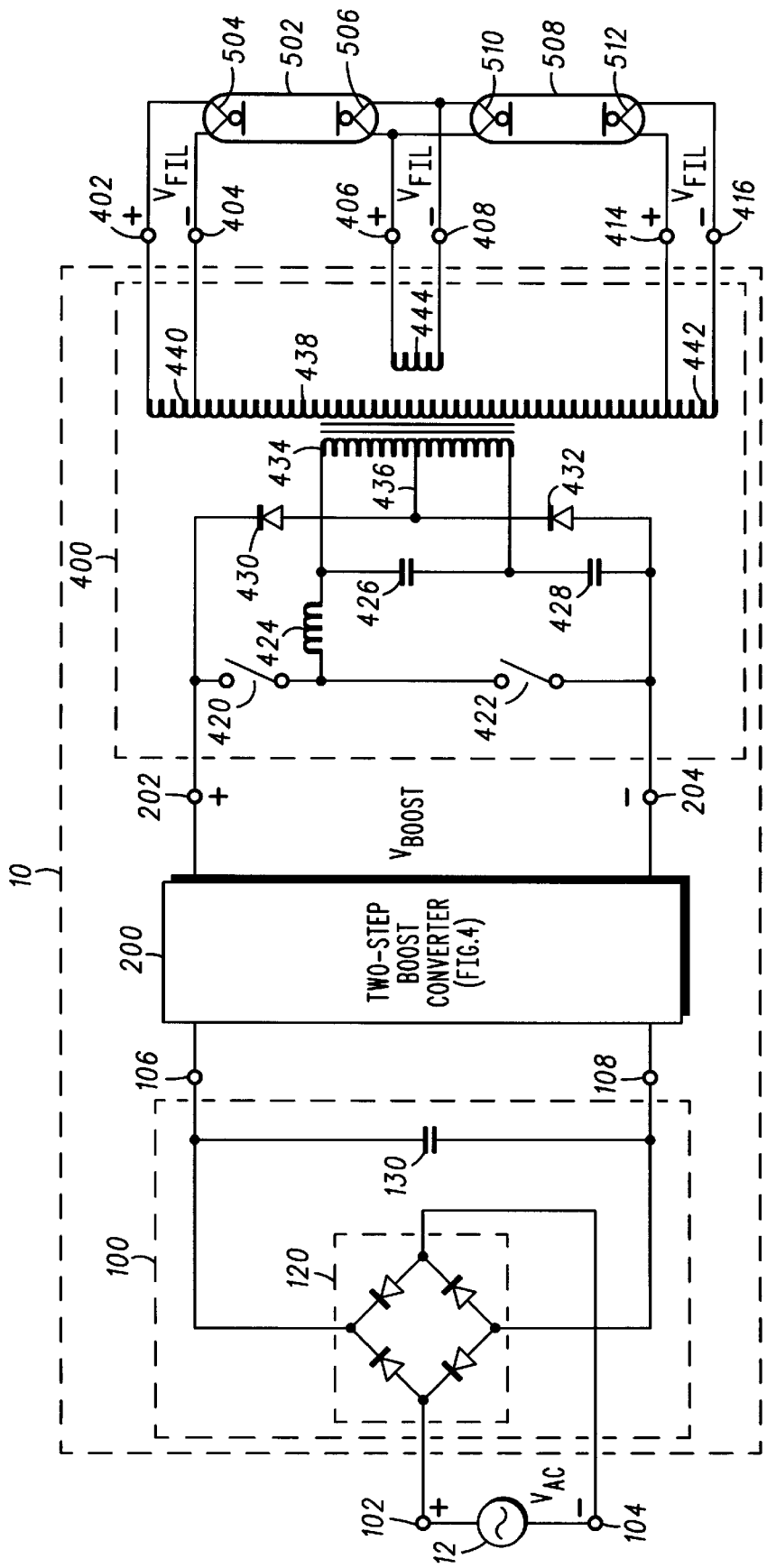
FIG. 5 is a detailed schematic of an electronic ballast with a two-step boost converter and a half-bridge series resonant inverter, in accordance with a preferred embodiment of the present invention.

Turning now to FIG. 5, a preferred embodiment of ballast 10 is shown in greater detail. Rectifier circuit 100 comprises a full-wave diode bridge 120 and a high frequency filtering capacitor 130. Diode bridge 120 provides full-wave rectification of the AC input voltage, while capacitor 130 serves as a bypass for high frequency current drawn by boost converter 200, which is typically operated at frequencies in excess of 20,000 Hertz in order to more efficiently provide power factor correction and to prevent the occurrence of audible noise. Inverter 400 is a series resonant half-bridge inverter that includes two power switches 420,422 that are complementarily commutated at a high frequency rate that is also typically in excess of 20,000 Hertz. Inverter 400 further includes a dc blocking capacitor 428 and a series resonant circuit comprising a resonant inductor 424 and a resonant capacitor 426. The substantially sinusoidal output of inverter 400 is coupled to the lamps 502,508 by way of an output transformer that includes a primary winding 434 and a main secondary winding 438. Primary winding 434 is coupled across resonant capacitor 426 and includes a primary tap 436 that is coupled to a junction of two clamping diodes 430,432. The function of clamping diodes 430,432 is to protect inverter 400 from destruction due to overvoltage by limiting the voltage across the primary winding 436 when the main secondary winding 438 is unloaded or lightly loaded (i.e., lamps are either missing or are not ignited). The output transformer also includes filament taps 440,442 on the main secondary winding 438, as well as at least one filament winding 444 for providing filament heating when two or more lamps are present. Additional information regarding the operation of inverter 400 is given in U.S. Pat. No. 5,144,195, which describes an inverter that is very similar to inverter 400.

Referring now to FIGS. 2, 4, and 5, the operation of ballast 10 is explained in detail as follows. Inverter 400 is started and begins to operate within a relatively short period of time (e.g., with in 100 milliseconds) after AC power is first applied to ballast 10 at t=0. Boost converter 200 is intially off and remains off until such time, t=$t_1$, as the voltage across capacitor 284 reaches a level that is sufficient to activate boost control circuit 250. During the "boost startup delay" period, 0<t<$t_1$, the boost output voltage $V_{BOOST}$ is approximately equal to the peak voltage, $V_{AC,PEAK}$, of AC source 12. With inverter 400 operating and boost converter 200 off, ballast 10 provides to the lamp filaments a voltage, $V_{FIL}$, that is insufficient for filament preheating. During this same period, shifting circuit 300 remains off.

At t=$t_1$, the voltage across capacitor 284 finally reaches a level sufficient to activate boost control circuit 250. Boost control circuit 250 turns on and begins switching boost switch 208 on and off. Consequently, $V_{BOOST}$ increases from $V_{AC,PEAK}$ to $V_1$. At about the same time, auxiliary supply 270 becomes operable and begins to provide operating power for boost control circuit 250, as well as charging current for time delay circuit 360. At this point, since shunt circuit 320 is inactive, $V_{BOOST}$ is given by:

$$V_{BOOST}=[(R1 \div R2)+1)]* V_{REF}=V_1$$

where $V_{REF}$ is a fixed reference voltage that is internal to boost control circuit 250. With $V_{BOOST}$ now increased to $V_1$, $V_{FIL}$ is increased from its previously low value to a level that provides sufficient preheating of the lamp filaments. However, the voltage across the main secondary winding 438 is still at a level that is insufficient to ignite the lamps.

During the period $t_1$<t<$t_2$, $V_{BOOST}$ is maintained at $V_1$ and $V_{FIL}$ is maintained at a level that is appropriate for preheating the lamp filaments. In addition, once auxiliary supply 270 begins to operate (at t=$t_1$, or very shortly thereafter), timing capacitor 370 begins to charge up through timing resistor 366. The rate at which timing capacitor 370 is charged up is primarily a function of the voltage provided by auxiliary supply 270, the capacitance of capacitor 370, and the resistance of timing resistor 366. Voltage divider resistors 372,376 divide down the voltage across capacitor 370 to provide a voltage at the trigger output 364 that reaches the turn-on threshold of shunt switch 324 when the voltage across capacitor 370 builds up to an appropriate level at t=$t_2$.

At t=$t_2$, the voltage at trigger output 364 reaches the turn-on threshold, $V_{ON}$, of shunt switch 324 (if shunt switch 324 is implemented using a BJT, $V_{ON}$ is equal to about 0.7 volts). Therefore, at t=$t_2$, shunt switch 324 turns on, thereby placing shunt resistor 328 in an approximately parallel electrical connection with the lower resistor 218 of the voltage feedback network. Neglecting the small forward voltage drop across shunt switch 324, the new relationship for $V_{BOOST}$ can then be expressed as:

$$V_{BOOST}=\{R1*[(R2+R3) \div (R2*R3)]+1\}* V_{REF}=V_2$$

Due to shunt resistor 328 being switched in by shifting circuit 300 at t=$t_2$, $V_{BOOST}$ will increase from $V_1$ to $V_2$. As a result, the voltage across the secondary winding 438 of the output transformer will increase to a level that is sufficient to ignite the lamps. Shunt switch 324 will remain on, and $V_{BOOST}$ will therefore remain at $V_2$, as long as AC power is supplied to ballast 10.

Shifting circuit 360 is also designed to reset in the event that AC power to ballast 10 is momentarily interrupted or removed. Specifically, following loss of AC power, boost converter 200 and auxiliary supply 270 will cease to operate. Although no further current is supplied to timing circuit 360 after auxiliary supply 270 ceases to operate, timing capacitor 370 still retains a consider amount of stored energy. However, resistors 372,376 provide a convenient path through which capacitor 370 is rapidly discharged. In this way, timing circuit 360 is reset so that substantially the entire delay period, will be repeated and thus sufficient filament preheating will be provided, when AC power is reapplied to ballast 10.

The disclosed ballast 10 offers a number of important advantages over existing ballasts. By providing a two-step method of operating boost converter 200 so that proper filament preheating is provided, ballast 10 accommodates steady-state operation at an elevated boost voltage, with the attendant advantages of reduced power losses in the inverter and lower operating temperatures in the ballast. At the same time, ballast 10 circumvents the need for costly dedicated preheat circuitry by providing filament preheating in a passive manner through the use of a shifting circuit 300 that is relatively small, inexpensive, and easy to implement. This results in an economical ballast with enhanced energy efficiency, improved reliability, and little or no need for expensive thermal solutions such as potting, thermal grease, or use of components with high temperature ratings.

Although the present invention has been described with reference to a certain preferred embodiment, numerous modifications and variations can be made by those skilled in the art without departing from the novel spirit and scope of this invention.

What is claimed is:

1. A method of operating a boost converter in an electronic ballast for driving at least one fluorescent lamp having heatable filaments, the boost converter receiving an input voltage and operable to provide an output voltage, the method comprising the steps of:

(a) providing a filament preheat period wherein, following startup of the boost converter, the boost converter output voltage is increased from a pre-operating level substantially equal to the peak value of the boost converter input voltage to a first level that is substantially greater than the pre-operating level, and is then maintained at the first level for a predetermined delay period;

(b) shifting the output voltage of the boost converter to a second level upon completion of the delay period, the second level being greater than the first level in order to supply high voltage to ignite the lamps; and (c) maintaining the boost converter output voltage at the second level in order to provide steady-state operating power for the lamps.

2. The method of claim 1, wherein the first level is about 300 volts, the second level is about 400 volts, and the delay period is between about 300 milliseconds and about 800 milliseconds.

3. An electronic ballast for powering at least one fluorescent lamp, comprising:

a rectifier circuit having a pair of input connections and a pair of output connections, the input connections being adapted to receive a source of alternating current;

a two-step boost converter that is coupled across the rectifier circuit output connections and adapted to receive an input voltage therefrom, the boost converter having first and second output terminals and being operable to provide a boost output voltage between the first and second output terminals, the second output terminal being coupled to a circuit ground node, the boost converter comprising:
   a boost switch;
   a boost control circuit for driving the boost switch; and
   a shifting circuit that is coupled to the boost control circuit and that is operable:
      (i) following startup of the boost converter, to increase the boost output voltage from a pre-operating level substantially equal to the peak value of the boost converter input voltage to a first level that is substantially greater than the pre-operating level, and then to maintain the boost output voltage at the first level for a predetermined delay period; and
      (ii) upon completion of the predetermined delay period, to increase the boost output voltage from the first level to a second level in order to provide a high voltage for igniting the lamps, and then to maintain the boost output voltage at the second level in order to supply steady-state operating power to the lamps; and an inverter that is coupled across the boost converter output terminals, the inverter being adapted to power at least one fluorescent lamp.

4. The electronic ballast of claim 3, wherein the delay period is between about 300 milliseconds and about 800 milliseconds.

5. The electronic ballast of claim 3, wherein the first level is about 300 volts and the second level is about 400 volts.

6. The electronic ballast of claim 3, wherein the boost converter includes an auxiliary supply, and the boost control circuit includes a voltage control input.

7. The electronic ballast of claim 6, wherein the shifting circuit comprises:

a shunt circuit that is coupled between the voltage control input and the circuit ground node, the shunt circuit having an enable input; and a time delay circuit having a supply input that is coupled to the auxiliary supply and a trigger output that is coupled to the enable input of the shunt circuit, the time delay circuit being operable to activate the shunt circuit upon completion of the delay period.

8. The electronic ballast of claim 7, wherein the shunt circuit comprises a series combination of a shunt switch and a shunt resistor, the shunt switch having a turn-on threshold voltage and a control lead that is coupled to the enable input, the shunt switch being operable to turn on in response to a voltage that exceeds the turn-on threshold voltage being applied to the control lead.

9. The electronic ballast of claim 8, wherein the shunt switch comprises at least one of a bipolar junction transistor and a field effect transistor.

10. The electronic ballast of claim 7, wherein the time delay circuit comprises:

a timing resistor that is coupled between the supply input and a first node;

a timing capacitor that is coupled between the first node and the circuit ground node; and a voltage divider comprising:
       a first divider resistor that is coupled between the first node and a second node; and
       a second divider resistor that is coupled between the second node and the circuit ground node, the second node being coupled to the trigger output of the time delay circuit.

11. The electronic ballast of claim 7, wherein the auxiliary supply begins to operate and supply current after the boost converter begins to operate.

12. The electronic ballast of claim 7, wherein the boost converter includes a boost inductor having a primary winding and a secondary winding, and the auxiliary supply comprises the secondary winding and a supply rectifier, the secondary winding being coupled between a third node and the circuit ground node, the supply rectifier having an anode that is coupled to the third node and a cathode that is coupled to the supply input of the time delay circuit.

13. The electronic ballast of claim 7, wherein the inverter is a series resonant half-bridge inverter.

14. The electronic ballast of claim 7, wherein the rectifier circuit comprises a full-wave diode bridge.

15. An electronic ballast for powering at least one fluorescent lamp, comprising:

a rectifier circuit having a pair of input connections and a pair of output connections, the input connections being adapted to receive a source of alternating current;

a two-step boost converter that is coupled across the rectifier circuit output connections and adapted to receive an input voltage therefrom, the boost converter having first and second output terminals and being operable to provide a boost output voltage between the first and second output terminals, the second output terminal being coupled to a circuit ground node, the boost converter comprising:

a boost switch;

an auxiliary supply;

a boost control circuit for driving the boost switch, the boost control circuit including a voltage control input; and a shifting circuit that is coupled to the boost control circuit and that is operable:
 (i) following startup of the boost converter, to increase the boost output voltage from a pre-operating level substantially equal to the peak value of the boost converter input voltage to a first level that is substantially greater than the pre-operating level, and then to maintain the boost output voltage at the first level for a predetermined delay period; and
 (ii) upon completion of the predetermined delay period, to increase the boost output voltage from the first level to a second level in order to provide a high voltage for igniting the lamps, and then to maintain the boost output voltage at the second level in order to supply steady-state operating power to the lamps;

the shifting circuit comprising:
 a shunt circuit that is coupled between the voltage control input and the circuit ground node, the shunt circuit having an enable input, the shunt circuit comprising a series combination of a shunt switch and a shunt resistor, the shunt switch having a turn-on threshold voltage and a control lead that is coupled to the enable input, the shunt switch being operable to turn on in response to a voltage that exceeds the turn-on threshold voltage being applied to the control lead; and a time delay circuit having a supply input that is coupled to the auxiliary supply and a trigger output that is coupled to the enable input of the shunt circuit, the time delay circuit being operable to activate the shunt circuit upon completion of the delay period, the time delay circuit comprising:
  a timing resistor that is coupled between the supply input and a first node;
  a timing capacitor that is coupled between the first node and the circuit ground node; and
  a voltage divider comprising a first divider resistor that is coupled between the first node and a second node, and a second divider resistor that is coupled between the second node and the circuit ground node, the second node being coupled to the trigger output of the time delay circuit; and a series resonant half-bridge inverter that is coupled across the boost converter output terminals, the inverter being adapted to power at least one fluorescent lamp.

16. The electronic ballast of claim 15, wherein the delay period is between about 300 milliseconds and about 800 milliseconds.

17. The electronic ballast of claim 15, wherein the first level is about 300 volts and the second level is about 400 volts.

18. The electronic ballast of claim 15, wherein the boost converter includes a boost inductor having a primary winding and a secondary winding, and the auxiliary supply comprises the secondary winding and a supply rectifier, the secondary winding being coupled between a third node and the circuit ground node, the supply rectifier having an anode that is coupled to the third node and a cathode that is coupled to the supply input of the time delay circuit.

19. The electronic ballast of claim 15, wherein the shunt switch comprises at least one of a bipolar junction transistor and a field effect transistor.

20. The electronic ballast of claim 18, wherein the rectifier circuit comprises a full-wave diode bridge.

* * * * *